United States Patent
Kishi

(10) Patent No.: US 7,254,129 B2
(45) Date of Patent: Aug. 7, 2007

(54) WIRELESS PHONE AND WIRELESS COMMUNICATION METHOD

(75) Inventor: Takahiko Kishi, Yokohama (JP)

(73) Assignee: Samsung Electronics Co., Ltd. (KR)

( * ) Notice: Subject to any disclaimer, the term of this patent is extended or adjusted under 35 U.S.C. 154(b) by 874 days.

(21) Appl. No.: 10/658,894

(22) Filed: Sep. 10, 2003

(65) Prior Publication Data

US 2004/0049104 A1 Mar. 11, 2004

(30) Foreign Application Priority Data

Sep. 10, 2002 (JP) ............................. 2002-264048

(51) Int. Cl.
*H04L 12/66* (2006.01)
(52) U.S. Cl. ...................... 370/354; 370/353; 370/355; 370/356; 455/135; 455/550.1
(58) Field of Classification Search ..................... None
See application file for complete search history.

(56) References Cited

U.S. PATENT DOCUMENTS 6,674,746 B1 * 1/2004 Lamarque, III ............. 370/352

2002/0061012 A1 * 5/2002 Thi et al. .................... 370/352
2006/0023696 A1 * 2/2006 Berger et al. ................ 370/352

FOREIGN PATENT DOCUMENTS

JP 2002-111558 4/2002

* cited by examiner

Primary Examiner—Ramnandan Singh
(74) Attorney, Agent, or Firm—The Farrell Law Firm

(57) ABSTRACT

Disclosed are a wireless phone and a wireless communication method wherein communication quality estimation is made for both circuit switching and packet communication modes and sound of both the modes is interpolated mutually so as to improve the sound quality. The switching between first and second sound signals is performed at intervals of a speech pitch period based on quality information of first and second sound signals, where the first and second signals are received and decoded, respectively, through a first wireless communication in circuit switching mode and a second wireless communication in packet communication mode. A delay control signal is outputted to compensate for the time difference between the first and second sound signals, based on the quality information of the two sound signals, and the time difference is compensated for based on the delay control signal.

15 Claims, 3 Drawing Sheets

WIRELESS PHONE AND WIRELESS COMMUNICATION METHOD

This application claims priority to an application entitled "WIRELESS PHONE AND WIRELESS COMMUNICATION METHOD", filed in the Japanese Patent Office on Sep. 10, 2002 and assigned Serial No. 2002-264048, the contents of which is incorporated herein by reference.

BACKGROUND OF THE INVENTION

1. Field of the Invention

The present invention relates to a wireless phone that has both a sound and visual communication function based on a circuit connection using a cellular system, and a sound and visual communication function based on an IP connection using a local area communication system such as a wireless LAN.

2. Description of the Related Art

In a conventional wireless device capable of utilizing two different wireless communication systems, an inter-mode diversity scheme has been proposed as a method of using the two wireless communication systems together for improving sound quality. One inter-mode diversity method can be seen in Japanese Patent Publication No. 2002-111558 in which a diversity operation is performed for each frame or symbol in order to increase the inter-mode diversity effect.

However, such a method for improving sound quality is usable only in systems having the same wireless circuit characteristics, and cannot be used for a communication scheme that employs different types of switching systems, i.e., employs a system in circuit switching mode (i.e., a system based on circuit switching) and a system in packet communication mode (i.e., a system based on packet switching), in which transmission data formats are also different. In addition, the diversity operation is performed without taking into consideration the time difference of sound signals (or speech signals) between the two systems, a variation thereof, and sound characteristics, so it may fail to improve the sound quality.

In other words, the switching between a sound signal received and decoded through the circuit switching mode and a sound signal received and decoded through the packet communication mode is implemented mainly using a handover scheme in which their reception qualities are estimated so as to perform the switching between the two sound signals, respectively, obtained through the two different modes.

FIG. 3 shows an example of the conventional wireless phone using the handover scheme. As shown in this figure, after a received signal is converted into a baseband frequency at an RF section 21, a controller 24 switches a switch 34B at regular intervals so that the received signal is input to both a CDMA/BB (BaseBand) section 22 and a wireless LAN/BB section 23. The controller 24 receives call quality information output from both the CDMA/BB and wireless LAN/BB sections 22 and 23 to determine their call quality levels.

The controller 24 selects the signal with the higher of the two call quality levels, and thus switches the switches 34A and 34B so as to use a corresponding one of the CDMA/BB and wireless LAN/BB sections 22 and 23.

A CDMA sound codec is designed to secure a desired level of sound quality even under bad communication conditions such as variable bit rates. On the other hand, a wireless LAN system can satisfy a high SNR (Signal to Noise Ratio) requirement because it assumes a local area communication, and can simply secure high sound quality using a high bit rate codec.

However, even if the conventional system switches to one of the two modes having higher sound quality with reference to the sound quality information, the conventional system could fail to improve the overall sound quality due to the processing time difference between the two modes, etc., because the CDMA and wireless LAN sound codecs employ very different communication schemes. In addition, in the case where the wireless link is congested, fluctuations of the sound signal occur due to packet losses resulting from packet collisions or the delay variation of packet transmission.

A communication environment that absorbs the fluctuations exists, but the fluctuation absorption cannot be expected in an ad-hoc environment, so the conventional system may not be suitable for the sound signal communication even though it has a high SNR.

In other words, as shown in FIG. 3, the conventional handover method does not complement the two modes (i.e., the circuit switching and packet communication modes) with each other, but the controller 24 determines their communication qualities so as to merely use one of the two modes having higher communication quality. That is, it does not use the two modes simultaneously for improving the sound quality.

The communication quality of sound signals in the packet communication mode is distorted due to the deterioration of the BER (Bit Error Rate), and the conventional handover method also cannot estimate the fluctuations that are caused by delays occurring in handling the transmission and reception timing of wireless packets, as mentioned above. Thus, it cannot detect the switching timing with high accuracy, and cannot effectively perform the switching operation between the circuit connection and packet communication modes for improving sound quality.

SUMMARY OF THE INVENTION

Therefore, the present invention has been made in view of the above problems, and it is an object of the present invention to provide a wireless phone and a wireless communication method wherein communication quality estimation is made for both the circuit switching and packet communication modes, and sound of both the modes is interpolated mutually so as to improve the sound quality.

In accordance with one aspect of the present invention, the above and other objects can be accomplished by the provision of a wireless phone comprising a first wireless communication portion in circuit switching mode; a second wireless communication portion in packet communication mode; a controller for receiving quality information of both a first sound signal received and decoded through the first wireless communication portion, and a second sound signal received and decoded through the second wireless communication portion, and controlling switching between the first and second sound signals at intervals of a speech pitch period based on the quality information, while outputting a delay control signal to compensate for time difference between the first and second sound signals, based on the quality information; and a delay portion for receiving the delay control signal from the controller and compensating for the time difference between the first and second sound signals.

Preferably, the wireless phone further includes a correlator for calculating cross-correlation of signal waveforms between the first and second sound signals, wherein the controller calculates peak time variation of a cross-correlation value outputted from the correlator, and controls the switching between the first and second sound signals while replacing the quality information of the first and second sound signals with an estimation result that the second sound signal has lower quality as the peak time variation increases, and further performs a delay control to compensate for the time difference between the first and second sound signals based on peak time difference of the cross-correlation value.

Preferably, the controller adjusts a period of time for calculating the cross-correlation of the signal waveforms between the first and second sound signals.

Preferably, the second wireless communication portion extracts and transmits a sound packet in packet communication.

Preferably, in the case where data communication not employing sound is performed together with sound communication, i) if the controller detects that the first sound signal has low quality and the second sound signal cannot be received, the sound communication is performed by the first wireless communication portion, and the data communication is performed by the first wireless communication portion while the sound communication is not performed by the first wireless communication portion, and ii) if the controller detects that the second sound signal has low quality and the first sound signal cannot be received, packet communication for sound packets is performed by the second wireless communication portion, and the data communication is performed by the second wireless communication portion while there is no sound packet to be transmitted and received by the second communication portion.

Preferably, the second wireless communication portion controls a frame length of transmission packets in packet communication so that the frame length decreases as frequency of the switching between the first and second sound signals increases.

In accordance with another aspect of the present invention, there is provided a wireless communication method for performing a first wireless communication in circuit switching mode and a second wireless communication in packet communication mode, the method comprising the steps of a) performing switching between first and second sound signals at intervals of a speech pitch period based on quality information of the first and second sound signals, said first sound signal being received and decoded through the first wireless communication, said second sound signal received and decoded through the second wireless communication portion; b) outputting a delay control signal to compensate for time difference between the first and second sound signals, based on the quality information of the first and second sound signals; and c) compensating for the time difference between the first and second sound signals based on the delay control signal.

Preferably, the wireless communication method further includes the steps of d) calculating peak time variation of a cross-correlation value between the first and second sound signals; e) controlling the switching between the first and second sound signals while replacing the quality information of the first and second sound signals with an estimation result that the second sound signal has lower quality as the peak time variation increases; and f) performing a delay control to compensate for the time difference between the first and second sound signals based on peak time difference of the cross-correlation value.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
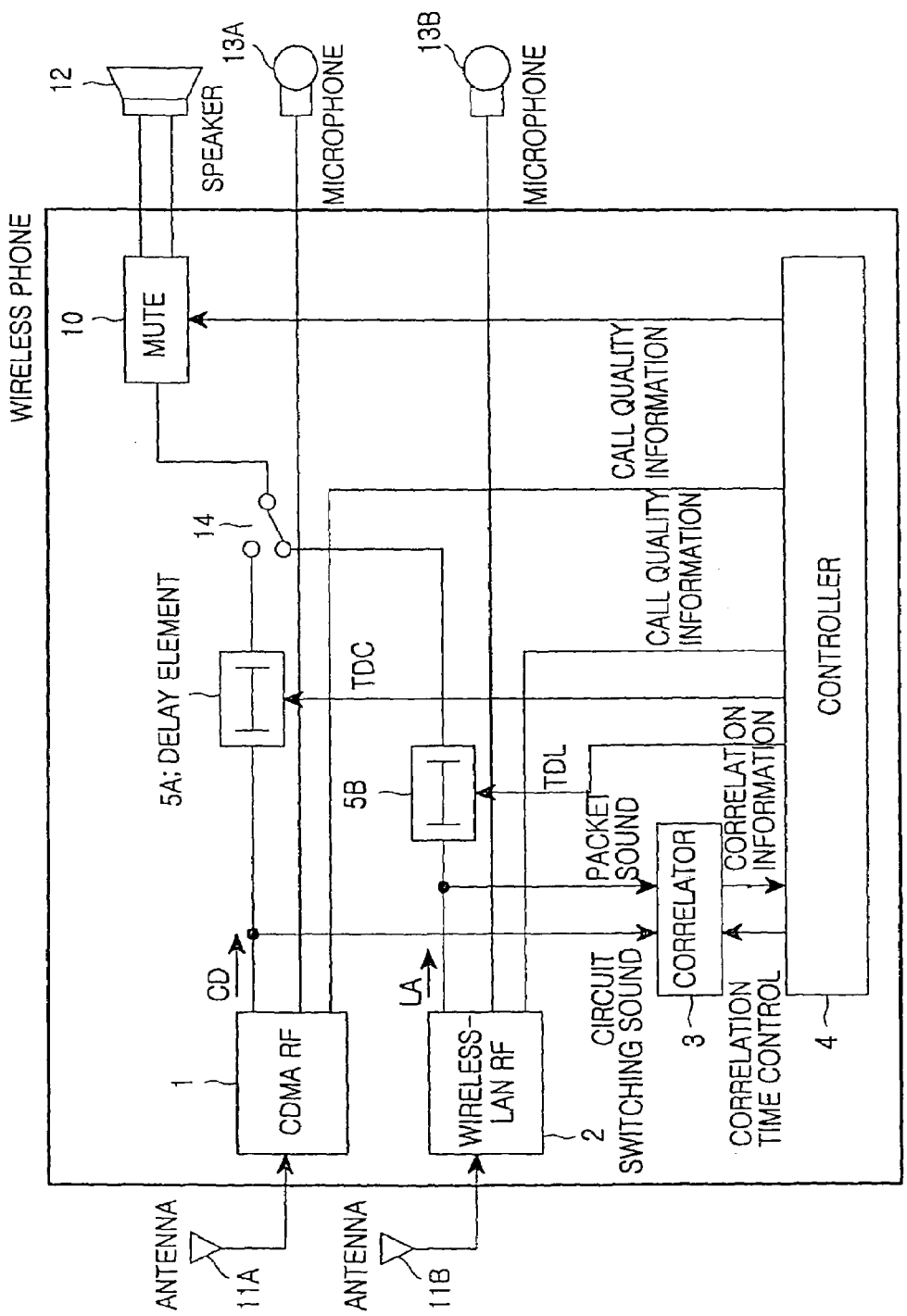
FIG. 1 is a block diagram showing the configuration of a wireless phone according to an embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

FIG. 1 is a block diagram showing the configuration of a wireless phone according to an embodiment of the present invention. In this embodiment, the wireless phone includes a CDMA RF (Radio Frequency) module 1, a wireless-LAN RF module 2, a correlator 3, a controller 4, delay elements 5A and 5B, antennas 11A and 11B, a speaker 12, microphones 13A and 13B, and a switch 14.

The CDMA RF module 1 is a wireless communication transmitter/receiver in CDMA mode (or circuit switching mode), and decodes/reproduces a received signal of a data format corresponding to the CDMA mode inputted from the antenna 11A, and then generates/outputs the signal waveform of a sound or speech signal CD. CDMA RF module 1 modulates a sound signal inputted from the microphone 13A, and then transmits it as a transmission signal through the antenna 11A.

The wireless-LAN RF module 2 is a wireless communication transmitter/receiver in wireless LAN mode (packet communication mode), and decodes/reproduces a received signal of a data format corresponding to the wireless LAN mode inputted from the antenna 11B, and then generates/outputs the signal waveform of a sound or speech signal LA. Wireless-LAN RF module 2 modulates a sound signal inputted from the microphone 13B, and then transmits it as a transmission signal through the antenna 11B.

The wireless-LAN RF module 2 has a buffer for maintaining the reproduced sound signal LA, and thereafter outputs the sound signal LA from the buffer when using the sound signal LA to complement the sound signal CD.

The buffer is composed of a CCD or a switched capacitor in the case where the sound signal LA is outputted as an analog signal, and employs a memory element such as an SRAM (Statistics Random Access Memory) or a DRAM (Dynamic Random Access Memory) in the case where the sound signal LA is outputted as a digital signal.

The correlator 3 calculates cross-correlation of signal waveforms between the sound signals CD and LA, and outputs the calculated cross-correlation information to the controller 4.

The controller 4 calculates the peak time variation of the cross-correlation value based on the above cross-correlation information, so as to estimate a fluctuation in the packet communication. A speech signal (or voiced sound signal) is quasi-periodic with repeated pitches of about 20 msec. Therefore, if the cross-correlation period is set to at least 20 msec, since the fluctuation of the sound signal LA obtained through the wireless LAN mode is also a quasi-periodic signal, the fluctuation can be estimated based on the sound signal CD that is stable with no fluctuation. That is, as the time variation increases, the fluctuation of the sound signal LA obtained through the wireless LAN mode increases and its sound quality is estimated to be lower.

The controller 4 also measures the time difference between the two sound signals CD and LA, based on the levels of the received signals output from the CDMA RF module 1 and the wireless-LAN RF module 2. Based on the measured time difference, the controller 4 outputs delay information TDC and TDL corresponding to delay times for sound signals output through the speaker 12, and transmits delay information TDC and TDL, to the delay elements 5A and 5B.

Accordingly, the controller 4 enables timing synchronization of signal waveforms between the two sound signals CD and LA.

The controller 4 performs the delay control operation based on the peak time difference of the cross-correlation value, in the case where the time difference between the two sound signals CD and LA cannot be measured from the level values of the received signals even if the signal levels of the sound signals CD and LA are inputted to the controller 4.

The delay elements 5A and 5B delay sound signals, outputted from the CDMA RF module 1 and the wireless-LAN RF module 2, by delay times indicated respectively by the delay signals TDC and TDL outputted from the controller 4.

Figure 2:
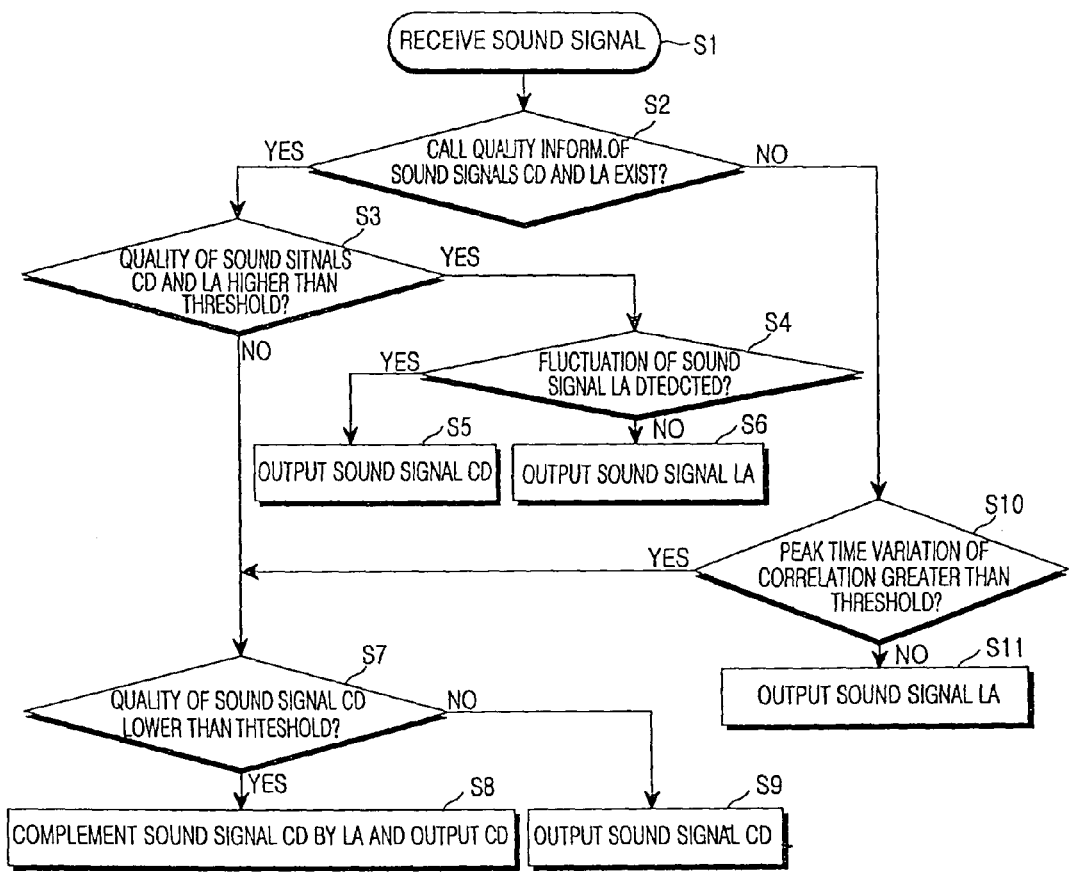
FIG. 2 is a flowchart showing the procedure in which a controller controls the output of sound signals CD and LA.
Figure 3:
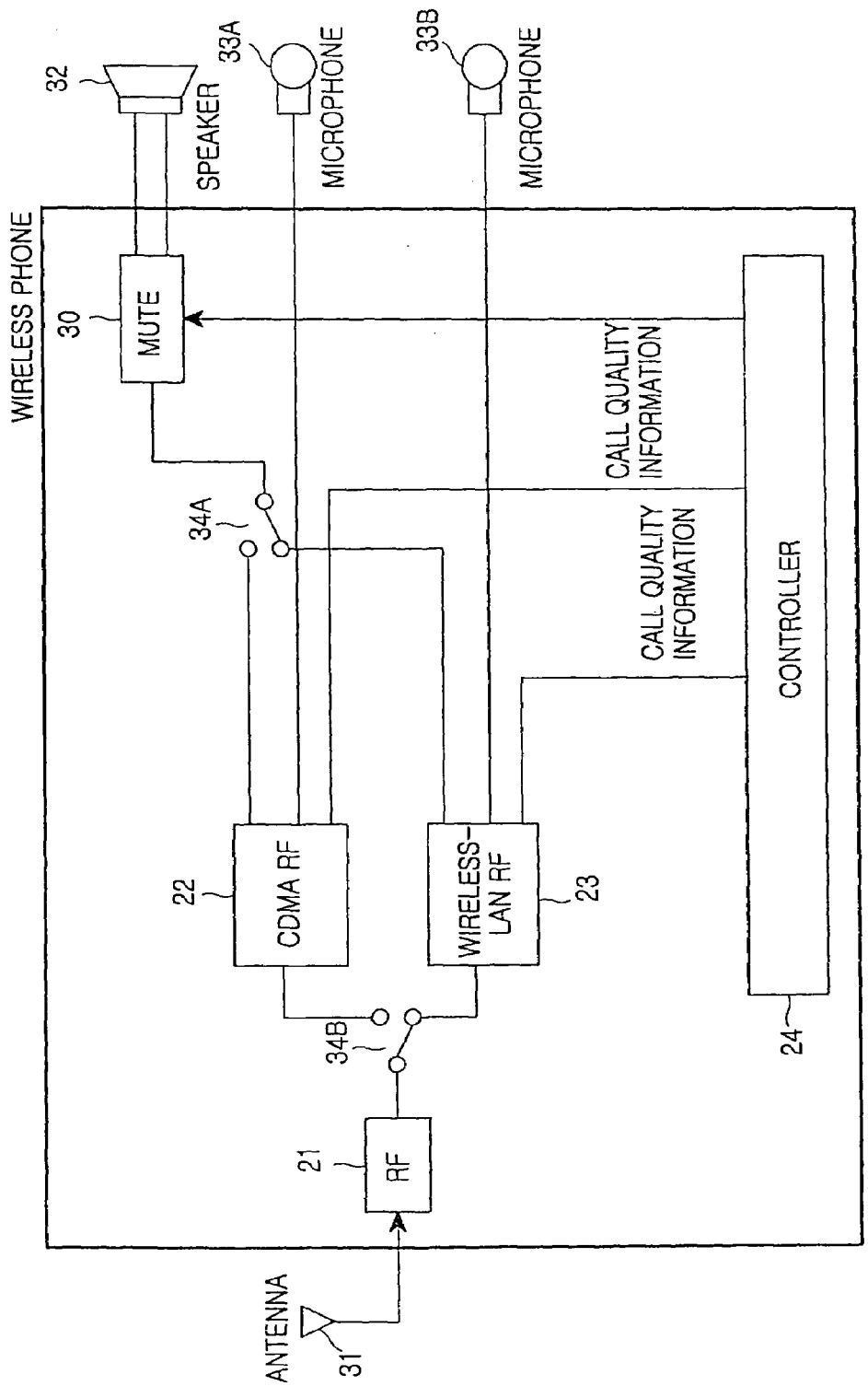
FIG. 3 shows an example of the conventional wireless phone.

The operation of the wireless phone in the embodiment will now be described with reference to FIGS. 1 and 2. FIG. 2 is a flowchart showing the procedure of controlling the output of the sound signals CD and LA.

When the antennas 11A and 11B detect wireless signals, the CDMA RF module 1 and the wireless-LAN RF module 2 receive the detected signals from antennas 11A and 11B, and output sound signals CD and LA to the correlator 3. When the RF modules obtain call quality information of the sound signals CD and LA, the two RF modules 1 and 2 output the obtained call quality information to the controller 4.

The correlator 3 receives the sound signals CD and LA, and calculates cross-correlation of signal waveforms between the sound signals CD and LA, and then outputs to the controller 4 the cross-correlation information, composed of cross-correlation values corresponding to the signal waveforms.

The controller 4 receives the call quality information of the sound signals CD and LA or the cross-correlation information thereof, and switches switch 14 at intervals of the speech pitch period to output the sound signals CD and LA to the speaker 12.

A detailed description will now be given of the procedure in which the controller 4 controls the output of sound signals CD and LA, with reference to FIG. 2.

When the antennas 11A and 11B detect wireless signals (step S1), it is determined if controller 4 has received call quality information of sound signals CD and LA (step S2). If the determined result of step S2 is that controller 4 has not obtained the call quality information of the sound signals CD and LA, controller 4 receives the cross-correlation information of the sound signals CD and LA, instead of the call quality information thereof. On the contrary, if the determined result of step S2 is that controller 4 has obtained the call quality information of the sound signals CD and LA ("Yes" at step S2), the controller 4 determines whether all of the sound signals CD and LA have a call quality higher than, or equal to, a predetermined threshold (step S3). If this determined result is affirmative, it is also determined, for example, whether a fluctuation is detected in the packet reception process, in order to estimate the quality of the sound signal LA (step S4). Based on this determined result, it is then determined which one of the two signals CD and LA is output through the speaker 12. If the determined result is that there is a detected fluctuation ("Yes" at step S4), the sound signal CD is estimated to have higher quality, so that the sound signal CD is output (step S5). If the determined result is that there is no detected fluctuation ("No" at step S4), the sound signal LA is estimated to have higher quality, so that the sound signal LA is output (step S6).

Accordingly, the controller 4 determines the sound reception quality of the CDMA RF module 1 based only on the level of the received signal, whereas it determines the sound reception quality of the wireless-LAN RF module 2 based on both the reception level and the fluctuation size. A fluctuation threshold, as a reference fluctuation size, to determine whether the reception quality is low, is determined timely based on estimations by a plurality of people who hear the sound signal LA outputted through the speaker 12. In addition, in this embodiment, the order of priority for the estimation (on which one of the sound signals CD and LA has higher sound quality) between the signal level and the fluctuation estimation result is also determined on a timely basis, similar to the above fluctuation threshold estimation.

Since the signal is a quasi-periodic signal, a speech signal will be composed of frames having the same pitch period if all the frames are compared with each other. In consideration of this characteristic of the speech signal, when there is a missing frame, the sound quality can be improved by complementing the missing frame by its neighboring frames, instead of having the system go into a mute state and determine the missing frame as null data.

However, in the case of the sound signal obtained through the circuit switching mode, when there is a missing frame or a frame of low sound quality, it is highly likely that frames in the vicinity of the defective frame are also missing or have low sound quality.

For this reason, the wireless phone in this embodiment allows controller 4 to complement the missing frame parts of the sound signal CD by the sound signal LA.

In other words, in the case where any one of the sound signals CD and LA has call quality lower than the predetermined value ("No" at step S3), if the quality of the sound signal CD is lower than the predetermined value ("Yes" at step S7), controller 4 outputs the sound signal CD by complementing it by the sound signal LA (step S8). On the other hand, if the quality of the sound signal LA is lower than the predetermined value and that of the sound signal CD is higher than, or equal to, the predetermined value ("No" at step S7), the sound signal CD is outputted without complementing it by the sound signal LA (step S9).

In the case where the sound signal LA is used to complement the sound signal CD, if a packet corresponding to the sound signal LA is extracted to be used for the complementing, it is possible to decrease data transmission and reception traffic in the wireless LAN, while reducing the packet communication cost.

In the case where the missing frame parts of the sound signal CD are complemented by the sound signal LA, when controller 4 performs the switching for the sound signal output through the speaker 12 at intervals of the speech pitch period, the sound signal LA may be output faster or slower than the sound signal CD if a fluctuation of the sound signal LA occurs in the packet processing. This may cause a mute state or a missing sound signal during the switching between the two sound signals CD and LA, thereby lowering the sound quality. Accordingly, controller 4 reads the time difference between the two sound signals CD and LA from their call quality information, and calculates two delay times respectively for the delay elements 5A and 5B based on the read time difference, and then outputs them, as delay information TDC and TDL, to the delay elements 5A and 5B, respectively.

In the meantime, in the case where there is no reduction of SNR or packet collision, the transmission efficiency of the wireless LAN is proportional to the packet length or the number of consecutive packets.

If long length packets and a large number of consecutive packets are adopted to increase the transmission efficiency, it causes an increase in the sound fluctuation due to the packet transmission delay.

For this reason, in the case where the switching between the sound signal CD through the CDMA and the sound signal LA through the wireless LAN is frequently performed, short length transmission packets and a small number of consecutive packets are employed to prevent the sound quality reduction due to the fluctuation. On the other hand, in the case where the switching between the two sound signals CD and LA is not frequently performed, long length transmission packets are employed to improve the data transmission efficiency.

In the meantime, controller 4 receives the cross-correlation information of the sound signals CD and LA if it has not obtained the call quality information of the sound signals CD and LA ("No" at step S2). Controller 4 reads the size of the peak time variation of the cross-correlation value from the received cross-correlation information and estimates the sound quality of the sound signal LA in the following way. As the peak time variation of the cross-correlation value increases, the sound signal is estimated to have lower sound quality, and as the peak time variation decreases, the sound signal is estimated to have higher sound quality.

In the case where the peak time variation of the cross-correlation value is greater than or equal to a predetermined threshold ("Yes" at step S10), controller 4 performs the switching operation of sound signals through the above step S7 and its subsequent steps. In particular, when the sound signal CD is output after being complemented by the sound signal LA (step S8), the following processes are needed. The time difference between the two sound signals CD and LA is read from the cross-correlation information of the two signals CD and LA, instead of from the call quality information of the two signals CD and LA. Then, the delay times of the delay elements 5A and 5B are calculated based on the read time difference, and the calculated delay times are output as delay information TDC and TDL to the delay elements 5A and 5B, respectively.

As described above, in the case where it uses one of the two sound signals CD and LA having higher quality, the wireless phone according to the present invention controls the time difference between the two sound signals CD and LA to switch the sound signal to be output, so that the sound quality can be greatly increased by performing such an independent switching operation.

The above embodiment has been described on the assumption that both the sound signals CD and LA are detected. However, in the case where only one of the two sound signals CD and LA is detected, the detected signal is used, and the switch 14 is controlled to output the detected signal through the speaker 12.

For example, in the case where data communication not including sound is performed together with the sound communication, if it is detected in controller 4 that the sound signal CD has low sound quality and the sound signal LA cannot be received, the sound communication is performed by the CDMA RF module 1 while controller 4 performs a Vox Process for the sound signal CD. While the CDMA RF module 1 detects that the sound communication is temporarily not performed, the CDMA RF module 1 performs the data communication. In this case, if the sound signal CD has sound quality higher than or equal to a predetermined value, the CDMA RF module 1 performs both the sound and data communications.

On the contrary, if it is detected that the sound signal LA has low quality and the sound signal CD cannot be received, the wireless-LAN RF module 2 performs sound communication in preference to utilizing sound packets. If controller 4 detects that there is no sound packet to be preferentially transmitted, the wireless-LAN RF module 2 performs the data communication during this detection time. If the sound signal LA has sound quality greater than or equal to a predetermined value, the wireless-LAN RF module 2 performs both the sound and data communications.

In the meantime, it is considered that a speech signal is a quasi-periodic signal with the same waveform being repeated at intervals of a regular pitch time of period, and the cross-correlation between the two sound signals CD and LA is calculated with the correlator 3. In this case, if the time difference between the sound signals CD and LA becomes higher than the speech-signal pitch period, it causes a signal residue between the signals.

In the case where the signal residue occurs, in order to calculate a real time difference between the sound signals CD and LA, it is required that the correlation period of time be increased to the extent that a recovered sound, rather than a sound signal included in the correlation period of time, can be discriminated as a desired sound. If the sound signal can be discriminated as a sound, it is possible to find the correspondence between the sound signals CD and LA which cause a time difference therebetween, so that the accurate time difference can be obtained by calculating the time difference based on the peak time variation of the cross-correlation value.

However, the amount of cross-correlation calculation varies depending on the preset correlation time. Thus, if the reduction of power consumption is given priority over the sound quality, it can be considered to shorten the correlation period of time even if the sound quality is somewhat low. In this case, for example, a power-saving, high-quality shift switch for changing the correlation period of time of the wireless phone may be provided, so that the user can change the correlation period of time on a timely basis in consideration of a real output of the speaker 12.

As apparent from the above description, the present invention provides a wireless phone and a wireless communication method, wherein the switching between first and second sound signals is performed at intervals of a speech pitch period based on quality information of a first sound signal and a second sound signal, respectively, received and decoded through a first wireless communication in circuit switching mode and a second wireless communication in packet communication mode, and a delay control signal is outputted to compensate for the time difference between the first and second sound signals, based on the quality information of the first and second sound signals, and further the time difference is compensated for based on the delay control signal. Accordingly, since the signal waveform can be switched without causing an empty part between the signal waveforms of the sound signal, or without loss of an overlapping part between the signal waveforms, it is possible to greatly improve the overall sound quality, compared to the prior art.

In addition, the peak time variation of a cross-correlation value between the first and second sound signals is calculated, and the switching between the first and second sound signals is controlled while replacing the quality information of the first and second sound signals with an estimation result that the second sound signal has lower quality as the peak time variation increases, and further a delay control for compensating for the time difference between the first and second sound signals is performed based on the peak time difference of the cross-correlation value. Thereby, the output sound switching can be controlled in consideration of sound fluctuations due to the packet communication.

Further, the controller adjusts the period of time for calculating the cross-correlation of the signal waveforms between the first and second sound signals. Accordingly, it is possible to detect a fluctuation from the cross-correlation value, based on the pitch period of the sound signal fluctuation, and further to calculate accurately the time difference based on the peak time variation of the cross-correlation value.

Furthermore, the second wireless communication portion extracts and transmits a sound packet in packet communication. This allows a reduction in data transmission and reception traffic, while decreasing the packet communication cost.

In addition, in the case where data communication not employing sound is performed together with sound communication, i) if the controller detects that the first sound signal has low quality and the second sound signal cannot be received, the sound communication is performed by the first wireless communication portion, and the data communication is performed by the first wireless communication portion while the sound communication is not performed by the first wireless communication portion, and ii) if the controller detects that the second sound signal has low quality and the first sound signal cannot be received, packet communication for sound packets is performed by the second wireless communication portion, and the data communication is performed by the second wireless communication portion while there is no sound packet to be transmitted and received by the second communication portion. This makes it possible to secure the sound quality while increasing data transmission efficiency.

Moreover, the second wireless communication portion controls the frame length of transmission packets in packet communication so that the frame length decreases as the frequency of switching between the first and second sound signals increases. Accordingly, it is possible to prevent a reduction in the sound quality due to the fluctuation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless phone, comprising:
   a first wireless communication portion in circuit switching mode;
   a second wireless communication portion in packet communication mode;
   a controller for receiving quality information relating to both a first sound signal received and decoded through the first wireless communication portion, and a second sound signal received and decoded through the second wireless communication portion, and controlling switching between the first and second sound signals at intervals of a speech pitch period based on the quality information, while outputting a delay control signal to compensate for time difference between the first and second sound signals, based on the quality information; and
   a delay portion for receiving the delay control signal from the controller and compensating for the time difference between the first and second sound signals.

2. The wireless phone as set forth in claim 1, wherein in the case where data communication not employing sound is performed together with sound communication, i) if the controller detects that the first sound signal has a quality less than a predetermined value and the second sound signal cannot be received, the sound communication is performed by the first wireless communication portion, and the data communication is performed by the first wireless communication portion while the sound communication is not performed by the first wireless communication portion, and ii) if the controller detects that the second sound signal has a quality less than a predetermined value and the first sound signal cannot be received, packet communication for sound packets is performed by the second wireless communication portion, and the data communication is performed by the second wireless communication portion while there is no sound packet to be transmitted and received by the second communication portion.

3. The wireless phone as set forth in claim 1, wherein the second wireless communication portion controls a frame length of transmission packets in packet communication so that the frame length decreases as frequency of the switching between the first and second sound signals increases.

4. The wireless phone as set forth in claim 1, further comprising a correlator for calculating cross-correlation of signal waveforms between the first and second sound signals,
   wherein the controller calculates peak time variation of a cross-correlation value output from the correlator, and controls the switching between the first and second sound signals while replacing the quality information of the first and second sound signals with an estimation result that the second sound signal has a quality that decreases as the peak time variation increases, and further performs a delay control to compensate for the time difference between the first and second sound signals based on peak time difference of the cross-correlation value.

5. The wireless phone as set forth in claim 4, wherein in the case where data communication not employing sound is performed together with sound communication, i) if the controller detects that the first sound signal has a quality less than a predetermined value and the second sound signal cannot be received, the sound communication is performed by the first wireless communication portion, and the data communication is performed by the first wireless communication portion while the sound communication is not performed by the first wireless communication portion, and ii) if the controller detects that the second sound signal has a quality less than a predetermined value and the first sound signal cannot be received, packet communication for sound packets is performed by the second wireless communication portion, and the data communication is performed by the second wireless communication portion while there is no sound packet to be transmitted and received by the second communication portion.

6. The wireless phone as set forth in claim 4, wherein the second wireless communication portion controls a frame length of transmission packets in packet communication so that the frame length decreases as frequency of the switching between the first and second sound signals increases.

7. The wireless phone as set forth in claim 4, wherein the controller adjusts a period of time for calculating the cross-correlation of the signal waveforms between the first and second sound signals.

8. The wireless phone as set forth in claim 7, wherein in the case where data communication not employing sound is performed together with sound communication, i) if the a quality less than a predetermined value and the second sound signal cannot be received, the sound communication is performed by the first wireless communication portion, and the data communication is performed by the first wireless communication portion while the sound communication is not performed by the first wireless communication portion, and ii) if the controller detects that the second sound signal has a quality less than a predetermined value and the first sound signal cannot be received, packet communication for sound packets is performed by the second wireless communication portion, and the data communication is performed by the second wireless communication portion while there is no sound packet to be transmitted and received by the second communication portion.

9. The wireless phone as set forth in claim 7, wherein the second wireless communication portion controls a frame length of transmission packets in packet communication so that the frame length decreases as frequency of the switching between the first and second sound signals increases.

10. The wireless phone as set forth in claim 7, wherein the second wireless communication portion extracts and transmits a sound packet in packet communication.

11. The wireless phone as set forth in claim 10, wherein in the case where data communication not employing sound is performed together with sound communication, i) if the controller detects that the first sound signal has a quality less than a predetermined value and the second sound signal cannot be received, the sound communication is performed by the first wireless communication portion, and the data communication is performed by the first wireless communication portion while the sound communication is not performed by the first wireless communication portion, and ii) if the controller detects that the second sound signal has a quality less than a predetermined value and the first sound signal cannot be received, packet communication for sound packets is performed by the second wireless communication portion, and the data communication is performed by the second wireless communication portion while there is no sound packet to be transmitted and received by the second communication portion.

12. The wireless phone as set forth in claim 11, wherein the second wireless communication portion controls a frame length of transmission packets in packet communication so that the frame length decreases as frequency of the switching between the first and second sound signals increases.

13. The wireless phone as set forth in claim 10, wherein the second wireless communication portion controls a frame length of transmission packets in packet communication so that the frame length decreases as frequency of the switching between the first and second sound signals increases.

14. A wireless communication method for performing a first wireless communication in circuit switching mode and a second wireless communication in packet communication mode, the method comprising the steps of:
  a) performing switching between first and second sound signals at intervals of a speech pitch period based on quality information of the first and second sound signals, said first sound signal being received and decoded through the first wireless communication, said second sound signal received and decoded through the second wireless communication portion;
  b) outputting a delay control signal to compensate for time difference between the first and second sound signals, based on the quality information of the first and second sound signals; and
  c) compensating for the time difference between the first and second sound signals based on the delay control signal.

15. The wireless communication method as set forth in claim 14, further comprising the steps of:
  d) calculating peak time variation of a cross-correlation value between the first and second sound signals;
  e) controlling the switching between the first and second sound signals while replacing the quality information of the first and second sound signals with an estimation result that the second sound signal has a quality that decreases as the peak time variation increases; and
  f) performing a delay control to compensate for the time difference between the first and second sound signals based on peak time difference of the cross-correlation value.

* * * * *